July 22, 1969    J. ALLEAUME    3,456,911
STATIC BEARING CONNECTING DEVICE OR THE LIKE AND ITS
VARIOUS APPLICATIONS
Filed July 12, 1967

INVENTOR
JEAN ALLEAUME
BY
Nolte & Nolte
ATTORNEYS

United States Patent Office 3,456,911
Patented July 22, 1969

3,456,911
STATIC BEARING CONNECTING DEVICE OR THE LIKE AND ITS VARIOUS APPLICATIONS
Jean Alleaume, Saint-Cloud, France, assignor to Technigaz, Paris, France, a company of France
Filed July 12, 1967, Ser. No. 652,742
Claims priority, application France, July 15, 1966, 69,611, Patent 1,493,105
Int. Cl. A47g 29/00; A47b 91/00, 95/00
U.S. Cl. 248—1                                14 Claims

ABSTRACT OF THE DISCLOSURE

A bearing connection between a supported structure such as a tank for example and an outer supporting construction, comprising a cluster or bundle of parallel rods or needles, mainly compressively loaded lengthwise and located in close order endwise between a pair of sockets or flanged trays integral with said supporting construction and supported structure, respectively, so as to be directed substantially at right angles thereto.

---

The present invention essentially relates to a static connecting device forming in particular but not exclusively a local or discrete support, carrier, bearing or sustaining arrangement, working or loaded preferably mainly in compression and positioned between a self-supporting structure consisting of a relatively rigid or stiff body or of a system of invariably connected elements and an outer supporting structure, as well as to the various applications resulting from the operation or use of such devices.

In the prior state of the art are already known connecting devices forming a support, comprising at least one connecting element capable of resisting failure through permanent collapse by crushing and/or buckling and interposed between a self-supporting structure or construction and its outer support, while being connected thereto by at least two opposite end portions or parts, respectively. Either or even generally both of said structures are often able to effect or to undergo small relative or mutual and localized or discrete displacements, caused by a thermal deformation or distortion ascribable to a change or variation in temperature or by a mechanical deformation or distortion under the action of applied loads. This is for example the case of a self-supporting storage tank, container, shell, casing, vat or like vessel, adapted to contain a strongly cooled liquefied natural gas, for example liquid methane at a very low temperature and mounted aboard a cargo conveying or transport ship, within the hold thereof. In such a construction, the tank is supported by the ship's hull and rests upon a number of discrete or local supports or bearings, consisting for instance of base members, pedestals or like bearing blocks, spaced from each other and disposed between the base or bottom of the tank and the ship's hull. In this example, during the precooling operation or step of the tank, before its being filled with liquefied gas, the tank is subjected to a significant contraction and if it is rigidly connected by its base supports or bearings to the ship's hull, such a connection opposes or impedes the thermal deformation or distortion, i.e. the contraction of the tank and gives rise to high additional stresses or strains within the tank and within the supports upon which it rests. Another cause for small relative or reciprocal motions in the aforementioned example is the alternate deformation and more specifically the alternate flexure of the ship's hull at sea under the influence of the swell or surge, which causes either a contraction by compression or an expansion by stretching of that portion of the hull which forms the bottom of the hold, according to or depending upon the direction of flexure, so that if the tank is invariably connected to the structure of the hull, it is compelled or forced to share in the flexure of the hull and thus works itself while undergoing undesirable additional mechanical stresses or strains which may be relatively large (since a ship's hull should be able to sustain for example a normal working stress of about 14 kg./mm.$^2$ or 20,000 lbs. per square inch) and add or superpose themselves to the normal working stresses allowed for in the tank. Moreover, the supports of the tank, which make the connection with the hull, also undergo alternate deformations and stresses according to the direction of deformation of the hull. The tank and its supports are therefore exposed to an additional fatigue.

The object of the invention is to obviate to or to remove the aforesaid drawbacks by providing a connecting and bearing device between the self-supporting structure, consisting for example of a tank of the aforesaid type, and its outer supporting structure, consisting for example of a ship's hull or of the carriage frame or body of a rolling vehicle or still by a stationary construction or plant, in such a manner that the outer supporting structure does not oppose or impede the deformations or distortions or relative motions of the tank or at the least does not substantially oppose them and that moreover, the tank does not share or take part in the deformations or distortions or relative displacements of the supporting structure. This object is achieved through the invention by imparting some limited or restricted relative mobility or movableness to at least one of the two aforesaid structures, so as to render it substantially independent from the deformations and reciprocal or relative displacements of the other structure, while allowing an as free as possible deformation, in particular of thermal character.

For this purpose, the device according to the invention is characterized in that each aforesaid connecting element is connected in such a manner, by at least one of its two opposite end portions or parts, to the aforesaid corresponding adjacent structure, that at least the other end portion or part be capable of some at least partial mobility, for example at least of rotation, with respect to a point of said element, while remaining substantially immovable, motionless, fixed or stationary with respect to the other adjacent structure to which said other end portion or part is connected.

According to another aspect or feature of the invention, the connecting means between at least one of the two opposite end portions or parts of said element and said corresponding adjacent structure is such as to allow a possibly limited or restricted movement of relative displacement by pivoting, rotating or spinning about at least the point of contact or engagement of said element with said adjacent or neighbouring structure which preferably consists of said outer support.

According to still another feature of the invention, each aforesaid connecting element is in substantially simply resting or applied or relatively free frictional contact, by at least one and preferably both of its two opposite end portions or parts, with two corresponding surface or wall portions, respectively, integral with or rigidly attached to both of said structures to be joined.

According to still a further feature or aspect of the invention, each aforesaid connecting element is capable of a relatively stable, elastic or resilient deformation or distortion, varying the mutual spacing distance between both aforesaid structures connected thereby.

According to still another feature of the invention, each aforesaid element consists of at least one relatively elongated or substantially slender member remaining substantially straight in the state of rest or in the non-loaded condition, such as a bar, rod, shank, stick, spindle, pin, switch, blade, leaf, web, foil, plate, needle or the like preferably with relatively pointed or sharp opposite ends and interposed between both aforesaid surface portions which are substantially parallel so as to be connected through simple contact therewith and that its general direction be at least approximately normal or perpendicular to said surfaces.

According to still another feature of the invention each aforesaid element exhibits a geometrical slenderness ratio great enough to allow an at least temporary elastic or resilient deformation by transverse flexure or bending under load and in particular under the working or operating compression loads. In the case for instance of said self-supporting tank, same may be supported by a plurality, series or set of such devices comprising each one at least one connecting element of the aforesaid type, so that when the tank contracts or expands, the upper or top portion of each connecting element is carried along by or moved together with the adjacent tank portion undergoing the thermal deformation, this making it pivot, rotate or spin, at its opposite end, about its point of contact with the adjacent portion of the hull, thereby avoiding to oppose or to impede the free thermal deformation or distortion of the tank without being itself subjected to excessive or prohibitively large stresses or strains. If, however, each one of these connecting and bearing devices comprises one single aforesaid connecting element only, the latter may possibly collapse so that it would be no longer able to carry out its supporting function when the load it supports exceeds the critical buckling load. To avoid such a drawback and according to still a further feature of the invention, a plurality of or several aforesaid, preferably substantially like elements are arranged, in each device, in a bundle, bunch, cluster, nest or pack of substantially parallel elements, said bundle or cluster lying between both of said surface portions which are for example substantially plane or flat and said elements being either spaced from each other or for example relatively narrowly spaced or in close order or near to each other or still arranged in contiguous or engaging relationship, so as to be in mutual contact with each other.

Such elements may for example consist of fine pointed or sharp rods or needles and the overall critical buckling load of such a cluster or bunch of needles is considerably above the arithmetical sum of the critical buckling loads of each individual needle, considered alone or separately. Thus, by way of pure illustration only, if use is made of a device according to the invention, composed of a cluster or bunch of 4,000 needles having a diameter of 2 mm. and a length of 200 mm., the critical buckling load of this assembly, such as it has been determined by a test or experimental measuring, is about 40 tons, whereas the arithmetical sum of the theoretical individual critical buckling loads, as determined mathematically by the computation carried out for each separate needle, is equal to 16 tons only, i.e. twice and a half lower than the critical load of the bunch or cluster of needles.

The overall critical buckling load of the device comprising such a cluster or bunch of needles may be increased by decreasing or reducing the effective buckling length of the cluster and to this end, according to another feature of the invention, said cluster or bunch is surrounded, encompassed, hooped, ringed or bound, preferably loosely, by at least one intermediate collar, forming an annular strap, clip, clamp, tie, binding hoop, curb or the like. By using one or several of such rings or hoops, the resistance of the assembly to relative movement, i.e. to the relative mobility of the device is of course increased. A device according to the numerical example given hereinabove, may allow a horizontal or transverse shift or displacement having an amplitude of about 1 cm.

According to still another feature of the invention, each aforesaid element or cluster is maintained assembled or joined or kept in position between two trays, plates, blocks or the like, preferably forming flanged cup-like or trough-like members with a substantially flat bottom and integral with or rigidly secured to said self-supporting structure and outer support, respectively. In the case of the above-mentioned tank, same will thus be supported by a number of spaced devices, comprising each one a bunch or cluster of needles, spikes, sprigs, brads, prongs, pins or the like which are kept fixed or captive by their points or tips between two opposite overlying trays, secured or fastened on the outer bottom of the tank and to the outer supporting or base structure formed by the ship's hull, respectively.

The device according to the invention thus exhibits the advantage of being of an extremely simple and economical manufacture or make and of easy mounting, positioning or erection.

In the advantageous or preferred form of embodiment stated hereinabove, each connecting element is connected by simple or mere applying or bearing contact of its opposite ends with both structures, respectively, it joins. It is also conceivable or possible to design other solutions of differing natures for the connecting system. Thus, according to an alternative embodiment or modification, each aforesaid connecting element may be hinged or pivotally connected, for example spherically, by at least one of its two opposite end or terminal portions, to the corresponding adjacent structure. According to another modification, it could be rigidly connected or constrainedly built in, by at least one of its two opposite end or terminal portions to or within the corresponding adjacent structure and be capable of elastic or resilient, at least partially rotary deformation, preferably by flexure or bending. The character of the connection at each end may be either the same at both opposite ends (for example both of them being either freely bearing through simple contact, or pivoted, or built in) or be different at each end (for example one end may be freely bearing through simple contact and the other end may be pivoted or built in or any other arrangement or combination two by two of these three connecting modes may be adapted.

It is thus found that the cluster or bunch of said elements acts, operates or works somewhat in a manner similar to the bristles of a brush or to the teeth of a comb, supporting or carrying a load directly or indirectly resting on or applied to the bristles or teeth.

The invention is also concerned with the various applications and uses of said device, in particular as multiple connecting bearings or supports between two supported and supporting structures, respectively, capable of relative reciprocal displacements through thermal and/or mechanical deformations, such as for example a self-supporting tank, forming a container, vat or like vessel for storing and preserving and/or transporting or conveying a material the temperature of which is very different from the ambient temperature, such as for example a liquefied natural gas, and mounted or arranged within a ship or a rolling vehicle or on a stationary support, as well as the fixed or stationary and movable or travelling systems, arrangements or plants provided with such devices.

The invention will be better understood and further objects, features, details and advantages thereof will appear as the following explanatory description proceeds, with reference to the accompanying diagrammatic drawings, given by way of examples only to illustrate several forms of embodiments of the invention and wherein:

FIGURE 5 is a view similar to FIGURE 2, of a device comprising a hooping ring or the like.

Figure 1:
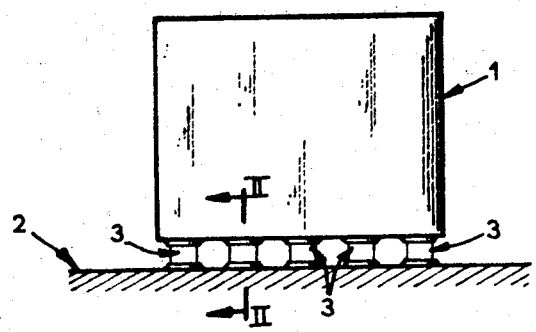
FIGURE 1 shows an outer side view of a storage tank for liquefied gas, mounted on its outer supporting structure.

According to the illustrative embodiment shown on FIGURE 1, a storage tank for a liquefied gas, for example for liquid methane and of self-supporting structure, generrally denoted by the reference numeral 1, is supported or borne by an outer supporting structure 2 through the medium of a number of devices 3 according to the invention distributed in spaced relationship under the lower bottom or base of the tank 1, so that the latter directly rests upon these devices. The outer supporting structure 2 may consist either of a ship's hull or of the carriage framework or body of a rolling transport vehicle, or still of the frame or structure of a stationary construction.

Figure 2:
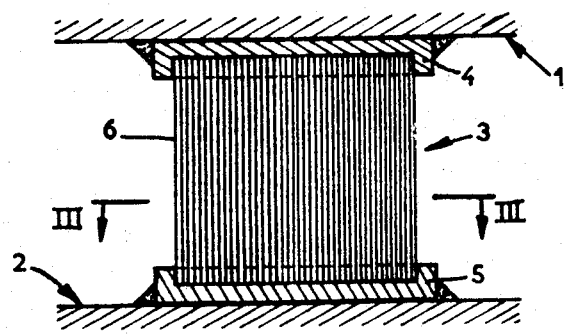
FIGURE 2 is a vertical or longitudinal section, at a larger scale, taken along the line II—II of FIGURE 1, of a device forming a connecting bearing system according to the invention.

FIGURE 2 shows that each device 3 is composed of an upper or top plate 4, made integral with the lower, for example substantially flat and horizontal bottom of the tank 1 and of a lower or bottom plate 5, preferably substantially like the plate 4 and rigidly fastened, secured or attached to the supporting structure 2, both plates 4, 5 thus lying substantially opposite or in confronting registering relation to each other, so as to be substantially symmetrical with respect to an intermediate horizontal plane. Each plate 4 or 5 comprises a substantially vertical or upstanding flange so as to thereby define inwards an inner substantially flat surface or bottom whereby each plate forms a kind of socket. Between both plates or sockets 4, 5 is disposed a cluster or bunch of relatively fine and substantially straight needles or the like 6, placed substantially vertically or in upright position so as to be in contact or engagement, with their opposite pointed or sharp ends with the plates or sockets 4 and 5, respectively. These needles 6 may be spaced from each other while being for example relatively near or close to each other, as is shown for example on FIGURE 3, or they may be narrowly spaced from each other or arranged in close order against each other, so as to be in mutual contact with each other.

Figure 3:
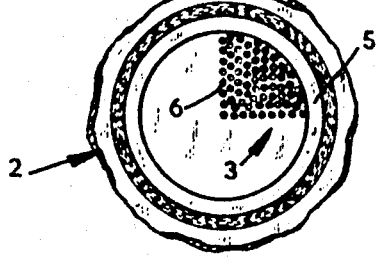
FIGURE 3 is a view in cross-section taken along the line III—III of FIGURE 2, showing cylindrical rods or needles with round cross-sectional contour.
Figure 4:
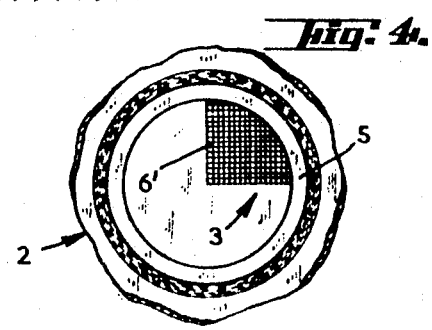
FIGURE 4 is a view, similar to the preceding one, of a device comprising rods or needles of square cross-sectional shape.

All the needles of a same cluster or bundle are advantageously of substantially like shape and size. Each needle 6 may have the shape of a substantially cylindrical or prismatic small bar or rod or of a substantially flat strip, blade, web or like lamination. Thus, on FIGURE 3 are shown cylindrical needles with a round or circular cross-section. Such a needle cross-sectional contour may of course be different and for example curvilinear or polygonal. It may in particular be rectangular or in the shape of a regular for example square, triangular or hexagonal polygon. Thus, FIGURE 4 shows a cluster or bundle of needles with square cross-section, placed side by side in direct contact with each other. The rectangular or regular polygonal shape (square, equilateral triangle or regular hexagon) of the needle cross-sectional contour exhibits the advantage to allow a better filling of the space available or left for the needles between both plates, trays or sockets 4 and 5. In effect, FIGURE 4 shows that a better use is made of such a space with needles of for example square cross-section which are thus able to engage each other with all their lateral surfaces, whereas in the case of needles having a circular or curved cross-section for example, there are gaps left between the contacting or closely arranged needles. However, circular cylindrical needles or needles having a shape of revolution are often simpler and more economical to be manufactured or made than needles exhibiting a cross-sectional contour of a different shape.

If instead of round needles, flat needles are used, for example in the form of flattened bars, leaves or strips, the mobility of the cluster or bundle is no longer isotrope or homogeneous in all directions, but is associated more particularly with a preferential direction which is substantially perpendicular to the flat face of the element or needle.

The plates, trays or sockets 4 and 5 and therefore the configuration or contour of the cluster or bundle of needles 6 may be of any shape. However, it may be advantageous for grounds of manufacture and mounting, that the plates, sockets or trays 4 and 5 have a substantially round or circular shape, so that the configuration of the cluster or bundle of needles 6 be substantially cylindrical.

Figure 5:
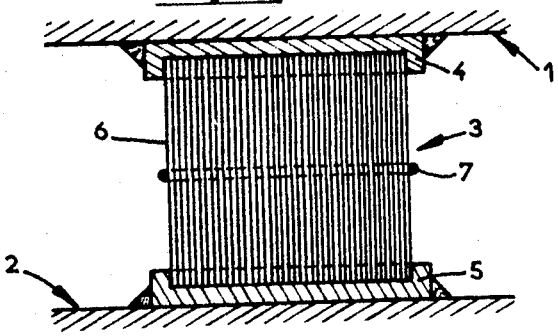

FIGURE 5 shows a device with the cluster or bundle of needles 6 encompassed or hooped by a ring-like member 7 which surrounds the cluster of needles without tightening it too much. Instead of a single hooping ring 7, it is of course possible to provide two or even a greater number of such hooping rings suitably spaced from each other.

For each device according to the invention, the parameters or factors, enabling to determine its mechanical characteristics, are: the total bearing or supporting surface area of the device, the number and diameter or the cross-sectional surface area of the rods or needles 6, their length or height, the number and spacing of the hooping rings 7. These hooping rings may besides have any cross-sectional shape.

In the exemplary form of embodiment referred to hereinabove, the device of the invention has been described and shown as vertically supporting a load by its upper or top end, while resting, through its lower or bottom end, upon an outer supporting structure. Of course, the devices according to the invention could also be used in whatever orientation or relative position, for example in a horizontal position between the vertical side walls of the tank 1 and the corresponding vertical walls of an outer supporting structure 2 and, in general, these devices are not limited or restricted to the use of a tank such as that described hereinabove, but may be used to achieve a bearing connection between any two bodies or structures.

It is to be understood that the invention should not be construed to be limited to the forms of embodiments described and shown herein, which have been given only by way of example, as many changes, alterations and modifications may be resorted to without departing from the scope of the invention as defined in the appended claims.

What is claimed is:

1. A static bearing device working mainly under compression and located between an outer supporting structure and a supported structure bearing thereagainst, comprising at least one connecting element resiliently resisting crushing failure and buckling collapse, interposed between said structures and consisting of a relatively elongated and slender strut-like rod member of substantially straight configuration in at least the non-loaded condition and state of rest, having relatively sharp pointed opposite ends and interposed between two corresponding wall surface portions integral with said structures to be joined, respectively, said rod member being, by its opposite ends, in simply applied, relatively free frictional contact engagement with said wall surface portions and having its general direction at least approximately perpendicular thereto, whereby at least one end portion of said rod member is at least partially capable of some at least rotary mobility relative to some point thereof, while remaining substantially stationary with respect to the structure engaged by the opposite end of said rod member, whereas a limited relative pivoting movement is allowed about at least the point of contact of at least one of the opposite ends of said rod member with the adjacent structure.

2. A device according to claim 1, wherein each connecting element exhibits a geometrical slenderness ratio, large enough to allow an at least temporary elastic deformation through transverse flexure under the working compression loads.

3. A device according to claim 2, wherein a plurality of like connecting elements are arranged in a cluster of substantially parallel and at least relatively closely spaced elements, said cluster being disposed between both of said wall surface portions which are substantially flat.

4. A device according to claim 3, wherein said elements are arranged in mutually contacting relation to each other.

5. A device according to claim 3, wherein said cluster is relatively loosely hooped by at least one intermediate ring shaped clamping collar.

6. A device according to claim 3, wherein each connecting element has at least its shank portion of substantially cylindrical shape.

7. A device according to claim 3, wherein each connecting element has at least its shank portion of substantially prismatic shape.

8. A device according to claim 3, wherein each connecting element has at least its shank portion in the shape of a substantially flat strip-like lamination.

9. A device according to claim 3, wherein each connecting element has at least its shank portion of substantially regular polygonal cross-sectional contour.

10. A device according to claim 3, wherein each cluster is kept in position between two flanged cup-like socket-forming trays having a substantially flat inner bottom surface and integral with said supported structure and with said outer supporting structure, respectively.

11. A device according to claim 5, wherein each cluster is kept in position between two flanged cup-like, socket-forming trays having a substantially flat inner bottom surface and integral with said supported structure and with said outer supporting structure, respectively.

12. A device according to claim 3, forming a bearing connection interposed between said outer supporting structure and said supported structure which consists of a relatively large storage tank supported by said supporting structure through a plurality of such discretely distributed devices.

13. A device according to claim 10, forming a bearing connection between said outer supporting structure and said supported structure which consists of a relatively large storage tank supported through a plurality of such discretely distributed devices.

14. A device according to claim 11, forming a bearing connection between said outer supporting structure and said supported structure which consists of a relatively large storage tank supported through a plurality of such discretely distributed devices.

References Cited
UNITED STATES PATENTS

| 2,189,708 | 2/1940 | Coyne | 248—21 |
| 2,359,036 | 9/1944 | Harper | 248—20 X |
| 2,729,443 | 1/1956 | Olinger | 248—22 X |
| 3,144,228 | 8/1964 | Kass | 248—21 |

FOREIGN PATENTS 777,093  6/1957  Great Britain.

CHANCELLOR E. HARRIS, Primary Examiner

U.S. Cl. X.R.

248, 346